United States Patent
Yang et al.

(10) Patent No.: US 10,308,286 B2
(45) Date of Patent: Jun. 4, 2019

(54) LIGHT WEIGHT ROCKER REINFORCEMENT

(71) Applicant: FORD GLOBAL TECHNOLOGIES, LLC, Dearborn, MI (US)

(72) Inventors: Herbert Yang, Saline, MI (US); Praveenmanickam Renganathan, Ann Arbor, MI (US); Shekar Prabhakar Erasala, Northville, MI (US); John Michael McGuckin, Ann Arbor, MI (US); Shawn Michael Morgans, Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/701,012

(22) Filed: Sep. 11, 2017

(65) Prior Publication Data
US 2019/0077462 A1  Mar. 14, 2019

(51) Int. Cl.
*B60K 37/00* (2006.01)
*B62D 21/15* (2006.01)
*B62D 27/02* (2006.01)

(52) U.S. Cl.
CPC ......... *B62D 21/157* (2013.01); *B62D 27/026* (2013.01)

(58) Field of Classification Search
CPC .. B62D 25/025; B62D 25/04; B62D 25/2036; B62D 21/157; B62D 25/20; B29C 66/7212
USPC .................. 296/209, 187.12, 193.05, 203.03
See application file for complete search history.

(56) References Cited

U.S. PATENT DOCUMENTS

| | | | | |
|---|---|---|---|---|
| 5,059,056 A * | 10/1991 | Banthia | ............... | A47B 47/0008 296/203.01 |
| 5,613,727 A * | 3/1997 | Yamazaki | ............... | B62D 25/02 296/187.12 |
| 6,247,287 B1 * | 6/2001 | Takabatake | ............. | B29C 44/18 264/46.6 |
| 6,467,834 B1 * | 10/2002 | Barz | ...................... | B62D 25/04 296/187.02 |
| 6,471,285 B1 * | 10/2002 | Czaplicki | ............. | B62D 29/002 296/187.02 |
| 6,478,367 B2 * | 11/2002 | Ishikawa | ................ | B62D 25/04 296/199 |
| 6,793,274 B2 * | 9/2004 | Riley | ................... | B62D 21/152 296/187.03 |
| 6,883,858 B2 * | 4/2005 | Barz | .................... | B62D 29/002 296/187.02 |
| 6,935,681 B2 * | 8/2005 | Hasler | .................. | B62D 29/002 296/203.02 |
| 7,063,376 B2 | 6/2006 | Ori et al. | | |

(Continued)

FOREIGN PATENT DOCUMENTS

EP  1806271  7/2007

*Primary Examiner* — Kiran B Patel
(74) *Attorney, Agent, or Firm* — Vichit Chea; Brooks Kushman P.C.

(57) ABSTRACT

A rocker assembly for a vehicle comprising a rocker panel and a side sill that enclose an injection molded reinforcement. The reinforcement includes a plurality of intersecting fins that may be provided in horizontal and vertical planes. An intermediate wall formed by frames within four sided cells that define windows. The rocker assembly may include two different types of reinforcements, one with intersecting fins, or walls, extending laterally and one formed by a plurality of longitudinally extending tubular members.

12 Claims, 6 Drawing Sheets

(56) References Cited

U.S. PATENT DOCUMENTS

| | | | |
|---|---|---|---|
| 7,125,461 B2* | 10/2006 | Czaplicki | B62D 29/002 156/79 |
| 7,160,491 B2* | 1/2007 | Barz | B62D 25/04 264/46.5 |
| 7,374,219 B2* | 5/2008 | Brennecke | B62D 29/002 296/187.02 |
| 7,445,269 B2* | 11/2008 | Yustick | B62D 21/157 296/187.01 |
| 7,641,264 B2* | 1/2010 | Niezur | B62D 25/00 296/187.02 |
| 8,210,603 B2* | 7/2012 | Favaretto | B62D 21/12 280/785 |
| 8,322,780 B2 | 12/2012 | Nagwanshi et al. | |
| 8,430,448 B2* | 4/2013 | Richardson | B62D 29/002 296/187.02 |
| 8,662,575 B2* | 3/2014 | Tamura | B62D 25/04 296/209 |
| 8,833,839 B2 | 9/2014 | Young et al. | |
| 9,340,232 B2* | 5/2016 | Baldwin | B62D 25/025 |
| 9,598,112 B1* | 3/2017 | Bach | B62D 25/04 |
| 9,821,854 B2* | 11/2017 | Bach | B62D 25/025 |
| 9,896,133 B2* | 2/2018 | Elfwing | B62D 25/025 |
| 9,908,562 B2* | 3/2018 | Mukainakano | B62D 25/04 |
| 10,035,544 B2* | 7/2018 | Lee | B62D 21/157 |
| 10,077,080 B2* | 9/2018 | Matsuda | B62D 25/02 |
| 10,081,391 B1* | 9/2018 | Tyan | B62D 25/00 |
| 10,106,205 B2* | 10/2018 | Richardson | B29C 69/02 |
| 10,131,381 B2* | 11/2018 | Ashraf | B60K 1/04 |
| 10,137,935 B2* | 11/2018 | Koch | B62D 21/157 |
| 2017/0072884 A1 | 3/2017 | Zannier | |
| 2017/0073020 A1 | 3/2017 | Ayuzawa et al. | |

\* cited by examiner

LIGHT WEIGHT ROCKER REINFORCEMENT

TECHNICAL FIELD

This disclosure relates to a light weight rocker assembly reinforcement for protecting a battery or fuel tank from side impact collision damage.

BACKGROUND

Rocker assemblies include a side sill (or inner panel) and a rocker panel (or outer panel) that are assembled as part of the body of a vehicle and are located below the doors of the vehicle.

Rocker assemblies are part of side impact protection structure of the passenger compartment and also protect fuel tanks and battery packs in hybrid vehicles. The batteries of electric vehicle must be protected to prevent damage to sensitive connectors and battery cells in side impact collisions. Rocker assemblies function to protect a passenger compartment in a collision. Rocker assemblies also function to provide crush strength for the roof of the vehicle. In addition, rocker assemblies provide a load path outside the passenger compartment of a vehicle in small offset front end collisions.

It is known to provide internal reinforcements inside a rocker assembly. One problem with prior art reinforcements is that the reinforcements, particularly those made of steel, add considerable weight to the rocker assembly that counteracts efforts to reduce the overall weight of a vehicle. Adding weight to a rocker assembly reduces vehicle fuel efficiency for internal combustion engines and operational range for battery powered vehicles.

This disclosure is directed to solving the above problems and other problems as summarized below.

SUMMARY

According to one aspect of this disclosure, a rocker assembly is disclosed for a vehicle that comprises a rocker, a side sill attached to the rocker, and a reinforcement. The reinforcement includes a first plurality of fins disposed in a longitudinal and transverse plane. A second plurality of fins is disposed in the transverse plane and a vertical plane that intersect with the first fins. A wall is disposed in the longitudinal plane and the vertical plane at a laterally intermediate location on the fins.

According to other alternative aspects of this disclosure, the wall may include a plurality of frames that define a window that extend between the window and the first and second fins. The size of the windows defined by the frames may be changed to adjust the stability of the wall.

The first and second groups of fins have first and second outer edges that conform to an inner surface of the rocker and an inner surface of the side sill and may be secured with an adhesive to the rocker and the side sill.

The first and second groups of fins may have a front column and a rear column of cells that are open to the rocker and side sill. The first fins may have an upper row and lower row of cells that are open to the rocker and side sill. The first and second groups of fins may be arranged to form a plurality of four sided cells inside the front column and the rear column of cells and the upper row and the lower row of cells. The frames that define the windows may be provided only on the rows of cells between the upper and lower rows of cells.

The second group of fins may have an outer edge that conforms to an inner surface of the rocker and an inner surface of the side sill.

The first or second group of fins may be spaced apart to a lesser extent to increase rigidity of the reinforcement. The thickness of the first or second group of fins may be enlarged to increase rigidity of the reinforcement.

According to another aspect of this disclosure, a rocker assembly is provided that includes a rocker, a side sill attached to the rocker, a first reinforcement, and a second reinforcement. The first reinforcement is received between the rocker and the side sill and has intersecting transversely extending walls that define laterally facing openings. The second reinforcement is received between the rocker and the side sill in front of the first reinforcement, and includes a plurality of longitudinally extending tubes that define longitudinally facing openings.

According to other aspects of this disclosure as it relates to a rocker assembly having two different reinforcements, the longitudinally extending tubes each may be connected to at least one other longitudinally extending tube.

The first and second reinforcements may be attached to the rocker and side sill by an adhesive.

An intermediate wall may be disposed in a longitudinal plane and a vertical plane. The intermediate wall may be provided at a transverse intermediate location on the intersecting transversely extending walls.

The wall may include frames that define a window extending between the window and the intersecting walls. The size of the window defined by the frames may be reduced to increase stability of the wall.

The transversely extending walls and the longitudinally extending walls may be spaced apart to a lesser extent to increase rigidity of the reinforcement. Alternatively, or in addition, the thickness of the transversely extending walls and the longitudinally extending walls may be increased to increase rigidity of the reinforcement.

The intersecting transversely extending walls may include horizontal walls disposed in a longitudinal and transverse plane that intersect vertical walls disposed in the transverse plane and a vertical plane. An intermediate wall may be disposed in the longitudinal plane and the vertical plane at an intermediate location on the horizontal walls and the vertical walls.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
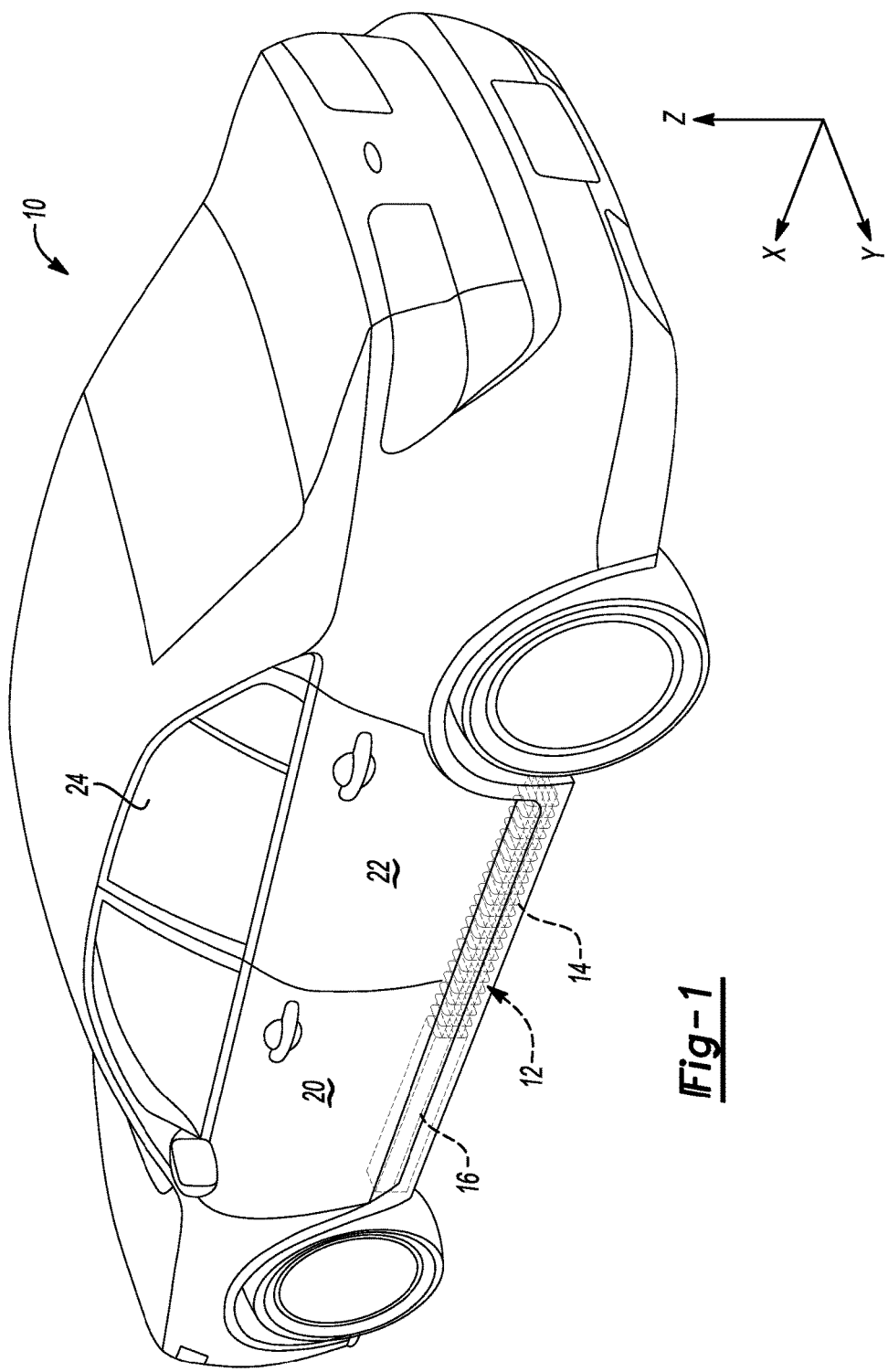
FIG. 1 is a left/rear perspective view of a vehicle illustrating the location of a rocker assembly made according to one aspect of this disclosure in phantom lines.

Referring to FIG. 1, a vehicle 10 is illustrated with a rocker assembly (shown in FIG. 2) including a combination rocker reinforcement 12 shown in dashed lines. The combination rocker reinforcement 12 includes a transverse wall reinforcement 14 and a longitudinal tube reinforcement 16. The transverse wall reinforcement 14 is provided to increase the resistance of the rocker assembly to lateral bending and longitudinal crush. The rocker assembly must be strong enough to resist rocker buckling and minimize side intrusion to protect a battery pack of a hybrid vehicle and also a fuel tank located inboard of the rocker assembly. The longitudinal tube reinforcement 16 is located within the rocker assembly in front of the transverse wall reinforcement 14. The longitudinal tube reinforcement 16 provides improved performance of the rocker assembly in a small offset collision.

The combination rocker reinforcement 12 is part of a rocker assembly that will be described further below with reference to FIG. 2 and is located below the front door 20 and rear door 22 of the vehicle 10. The rocker assembly 28 is part of the underbody that is located at an outer portion of the vehicle 10 to protect a passenger compartment 24 (shown in FIG. 1).

Figure 2:
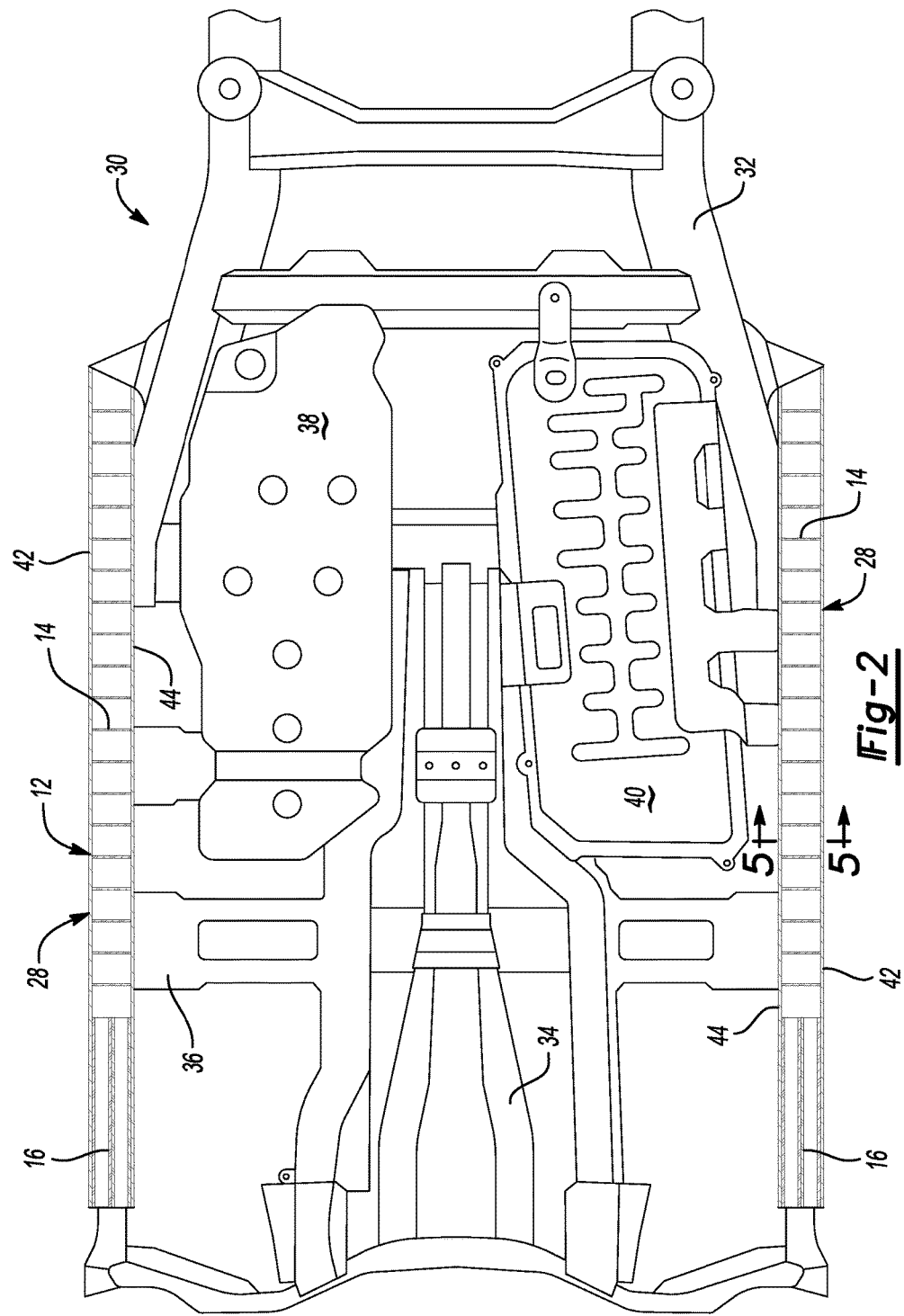
FIG. 2 is a fragmentary bottom plan view of a vehicle, partially in cross-section through the rocker assemblies provided on both sides of the vehicle.

Referring to FIG. 2, an underbody structure 30 is partially illustrated in the area of the passenger compartment 24 (shown in FIG. 1). The underbody structure 30 includes a pair of longitudinal frame members 32 and a plurality of tunnel runners 34. The longitudinal structure may also include the rocker assemblies 28 (including side sills and rocker panels), sled runners and the like. Lateral cross-members 36 may include a first cross-member, a 2.5 cross-member, a third cross-member and a fourth cross-member. In a hybrid vehicle, a fuel tank 38 and a battery pack 40 may be assembled to the underbody structure 30 inboard of the rocker assembly. Each rocker assembly 12 includes a rocker panel 42 and a side sill panel 44 that together house the rocker reinforcement 12.

Figure 3:
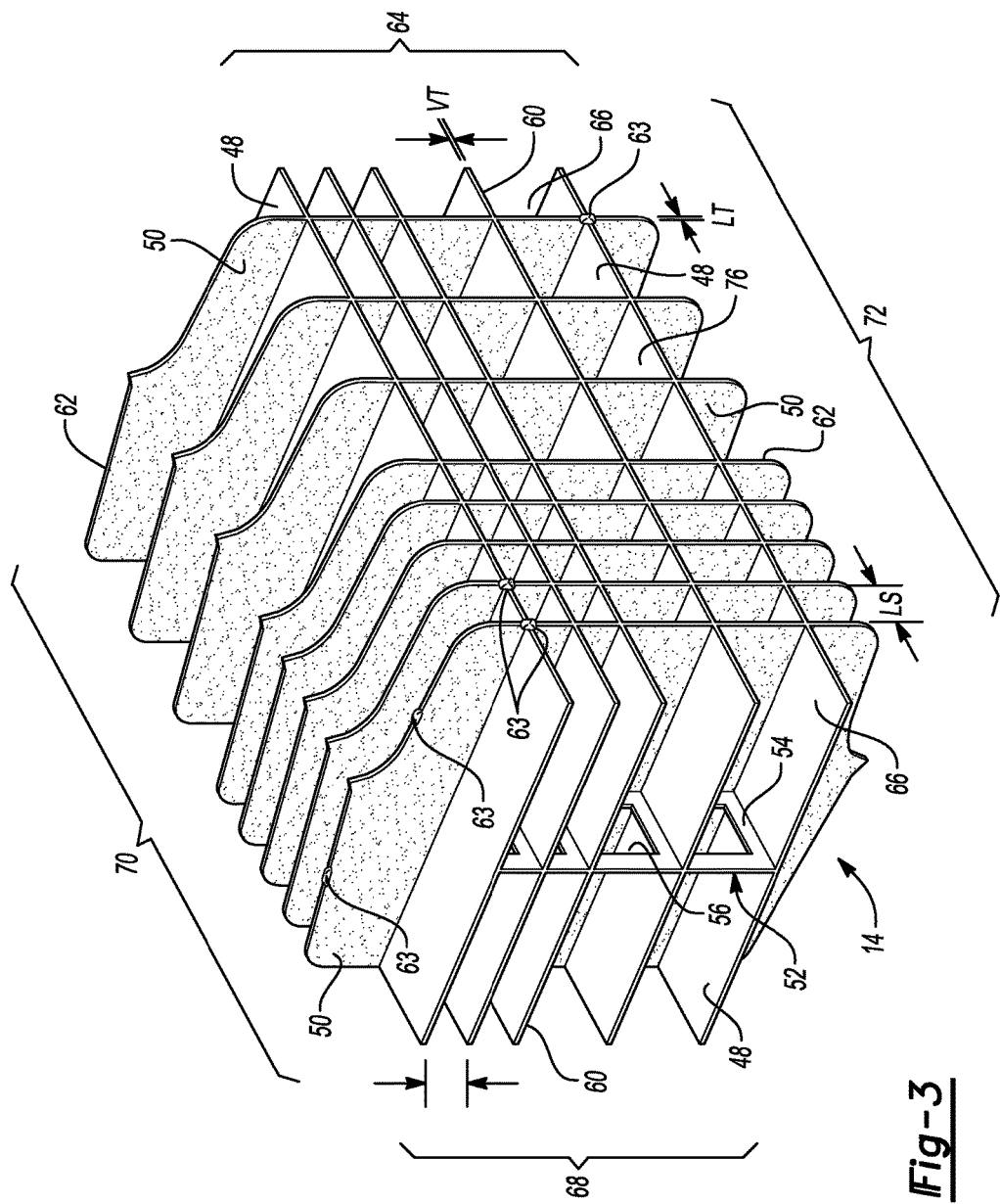
FIG. 3 is a perspective view of a rocker reinforcement.
Figure 4:
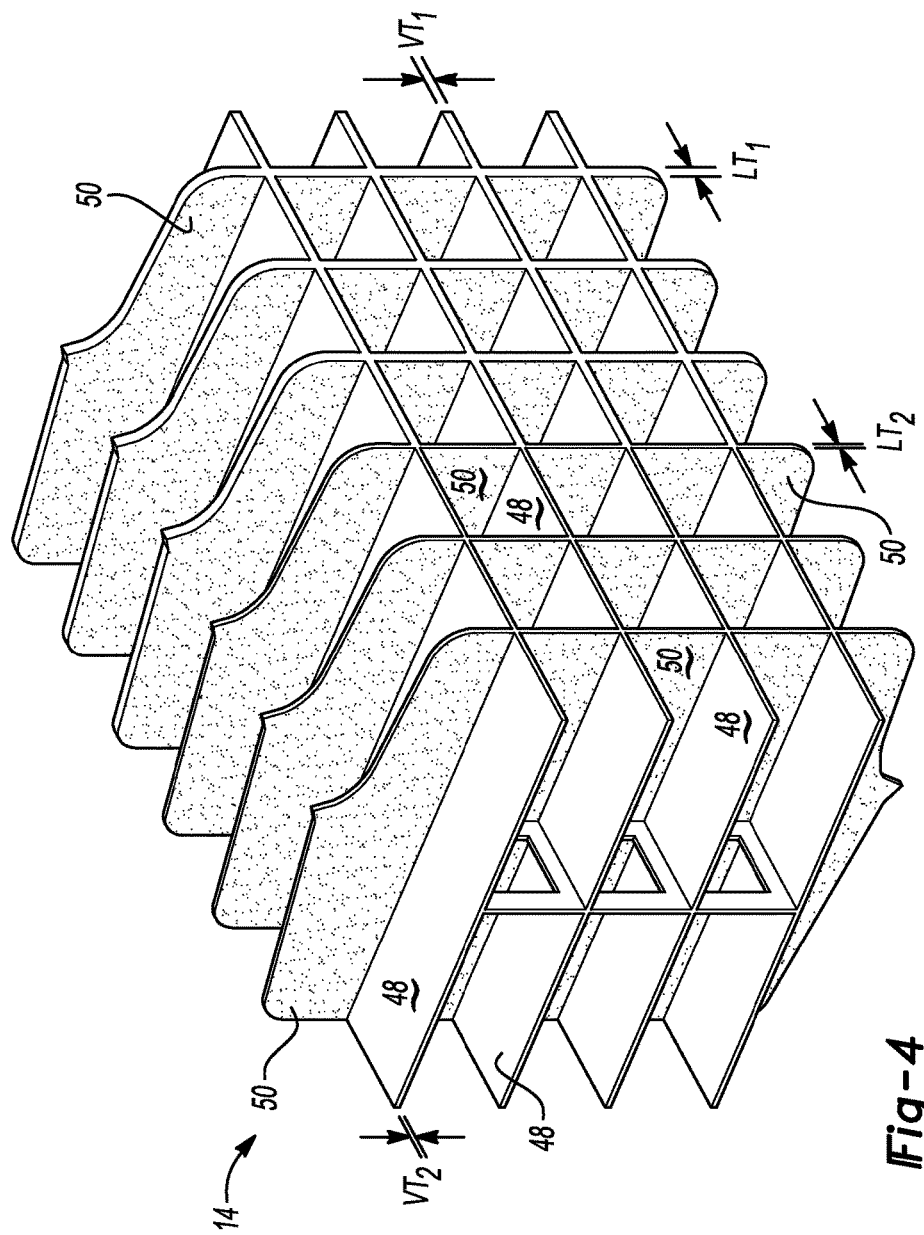
FIG. 4 is a perspective view of an alternative embodiment of a rocker reinforcement.

Referring to FIGS. 3 and 4, a first set of fins (or walls) are shown to extend in a longitudinal/transverse plane (hereinafter L/T plane). A second set of fins (or walls) are shown to extend in a transverse/vertical plane (hereinafter TN plane). As referred to herein, the terms longitudinal, lateral and vertical refer to vehicle directions with the longitudinal direction being the direction that the vehicle is driven, the lateral direction being the cross-car direction and the vertical direction being the height of the vehicle.

An intermediate wall 52 is provided at an intermediate transverse location between the transverse ends of the first set of fins 48 and second set of fins 50. The intermediate wall 52 is made up of a plurality of frames 54 that are attached to the first set of fins 48 and second set of fins 50 on the edges of the frames 54. Each of the frames 54 may define a window 56. The intermediate wall 52 is provided to stabilize the transverse wall reinforcement 14 by preventing the first set of fins 48 and second set of fins 50 from collapsing or "match boxing". The windows 56 defined by the frames 54 reduce the weight of the transverse wall reinforcement 14.

The transverse wall reinforcement is preferably formed in an injection molding operation and the frames 54 are located at the parting line between the two halves of the injection molding die. The reinforcement 14 is preferably formed of a durable polymer; such as glass-filled nylon. Alternatively, the reinforcement could be made of another injection moldable polymer having fillers or reinforcements as needed to provide strength.

The first set of fins 48 each have a first outer edge 60 that extends in the L/T plane around the outer periphery of each of the first set of pins 48. The second set of fins 50 each include a second outer edge 62 that extends in the T/V plane around each of the set of fins 50.

A front column 64 of open cells 66 and a rear column 68 of open cells 66 are provided on opposite longitudinal ends of the reinforcement 14. An upper row 70 and lower row 72 of open cells 66 are provided that engage the inner side of the rocker panel 42 and side sill panel 44.

The edges 60, 62 may be coated or may otherwise receive spaced deposits of adhesive 63. The adhesive 63 is used to secure the reinforcement 14 within the rocker panel 42 and the sill panel 44. The adhesive 63 prevents the reinforcement 14 from vibrating or shifting or shifting within the rocker assembly 12 and also adds strength to the assembly. The adhesive may be a structural adhesive or an adhesive that expands when the vehicle 10 is processed through an oven or heating operation.

Interior cells 76, or four-sided cells, are provided inboard of the open cells 66 in the front and rear columns 64, 68 and upper and lower rows 70, 72. These interior cells have four sides with two sides being formed by the first set of fins 48 and two sides formed by the second set of fins 50. The longitudinal thickness (hereinafter the LT) of the second set of fins 50 may be modified to increase the strength or decrease the weight of the reinforcement 14. The vertical thickness (hereinafter the VT), as indicated, may also be varied to increase the strength or decrease the weight of the first set of fins 48. In FIG. 3, the LT and VT is the same for all of the fins 48, 50. The longitudinal spacing (hereinafter the LS) of the fins, as shown in FIG. 3, may be varied or set at a predefined spacing to increase the strength or decrease the weight of the reinforcement 14.

Referring to FIG. 4, the longitudinal thickness may be varied as illustrated wherein longitudinal thickness of the second fins 50 is thicker where indicated as $LT_1$ than the fin thickness $LT_2$ as shown in FIG. 4. Similarly, the vertical thickness of the first fins where indicated as $VT_1$ is greater than the vertical thickness $VT_2$ of others of the first set of fins 48. The thickness of the first set of fins 48 may vary across the length of the first set of fins. By changing the longitudinal thickness LT and vertical thickness VT, the rigidity and strength of the reinforcement 14 may be changed to suit specific requirements of strength along the length of the rocker assembly.

Figure 5:
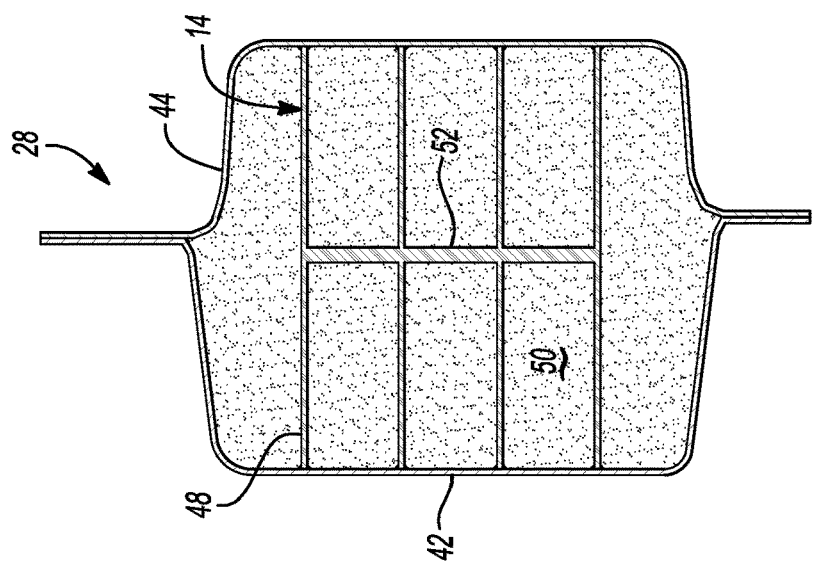
FIG. 5 is a cross-section view taken along the line 5-5 in FIG. 2.

Referring to FIG. 5, a rocker assembly 28 is shown to include the rocker panel 42 and the side sill panel 44. The transverse wall reinforcement 14 is shown to include a first set of fins 48 and a second set of fins 50. The intermediate wall 52 interconnects the first set of fins 48 and second set of fins 50 at an intermediate location between the rocker panel 42 and side sill panel 44. The intermediate wall 52 and first set of fins 48 as illustrated have the same thickness.

Figure 6:
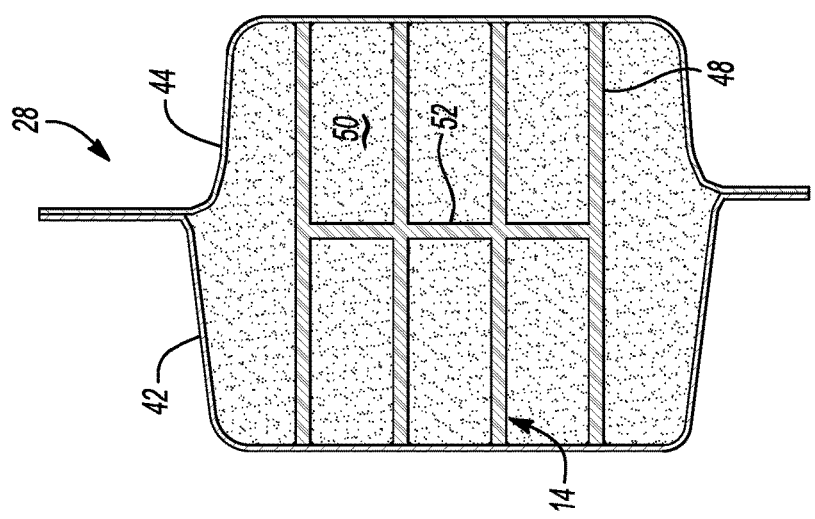
FIG. 6 is a cross-sectional view similar to FIG. 5 showing an alternative embodiment of a rocker reinforcement inside a rocker assembly.

Referring to FIG. 6, a transverse wall reinforcement 14 is shown disposed within a rocker panel 42 and side sill panel 44. The fins 48 and intermediate wall 50, as shown in FIG. 6, are substantially thicker than those shown in FIG. 5 and would provide greater resistance to buckling and minimizing side intrusion. The thicker intermediate wall 52 may be provided to increase the stability of the reinforcement 14.

Figure 7:
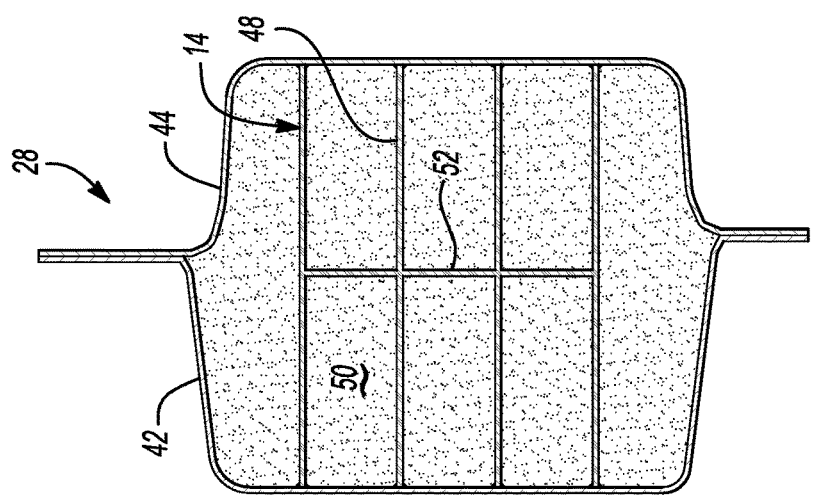
FIG. 7 is a cross-sectional view similar to FIG. 5 showing an alternative embodiment of a rocker reinforcement inside a rocker assembly.

Referring to FIG. 7, another alternative embodiment of a transverse wall reinforcement 14 is illustrated with a thicker intermediate wall 52 compared to the thickness of the fins 48. In this embodiment, weight is reduced by reducing the thickness of the fins 48 while the stability of the reinforcement 14 may be increased by providing a thicker intermediate wall 52. The reinforcement is shown within the rocker assembly 28 between the rocker panel 42 and side sill panel 44 as previously described with reference to FIGS. 5 and 6.

The reinforcement may be manufactured with different wall thicknesses, wall spacing, frame size, compositions and fiber reinforcements to meet performance and energy absorption requirements.

Figure 8:
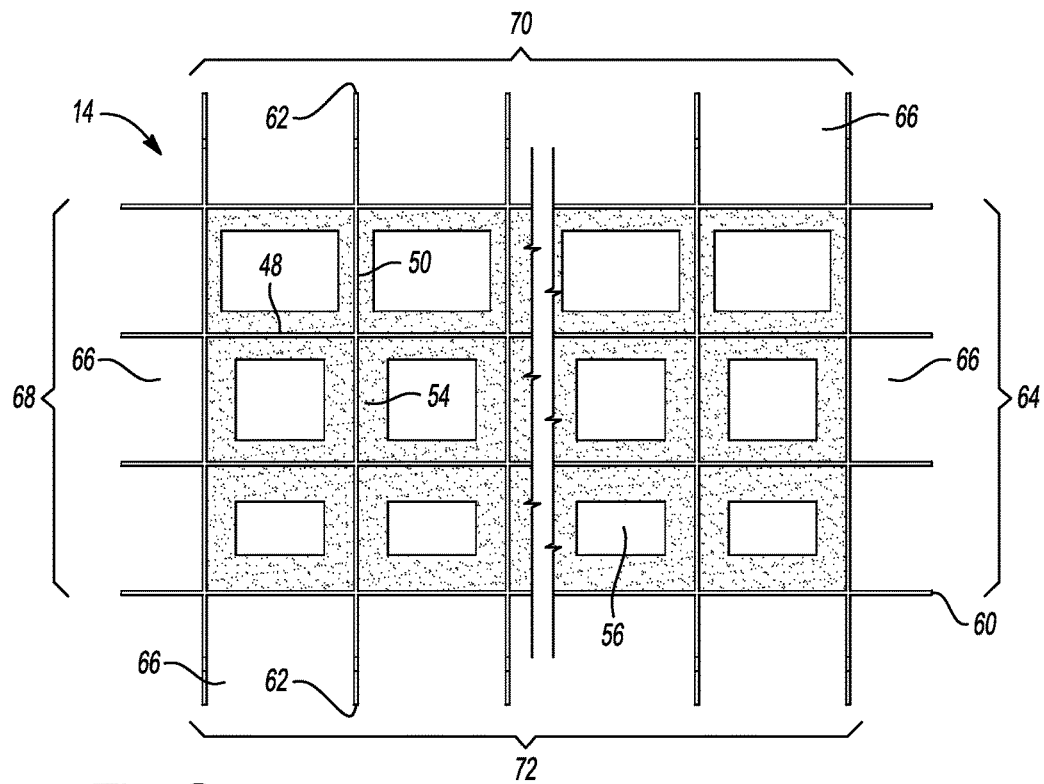
FIG. 8 is a side elevation view of a rocker reinforcement having a wall disposed within a first and second group of intersecting fins.

Referring to FIG. 8, the transverse wall reinforcement 14 is shown to include intersecting fins 48 and fins 50. It should be understood that the fins 48 and fins 50 could be provided as diagonally intersecting walls that do not extend vertically and horizontally. Frames are included between the first and second set of fins 48, 50 and extend from the fins 48 and 50 to define a window 56 within each of the frames 54. An upper row 70 and lower row 72 of open cells do not include the frames 54. A front column 64 and rear column 68 of open cells 66 are also shown in FIG. 8. The first set of fins 48 terminate at the first outer edges 60. The second set of fins 50 terminate at the second outer edges 62.

Figure 9:
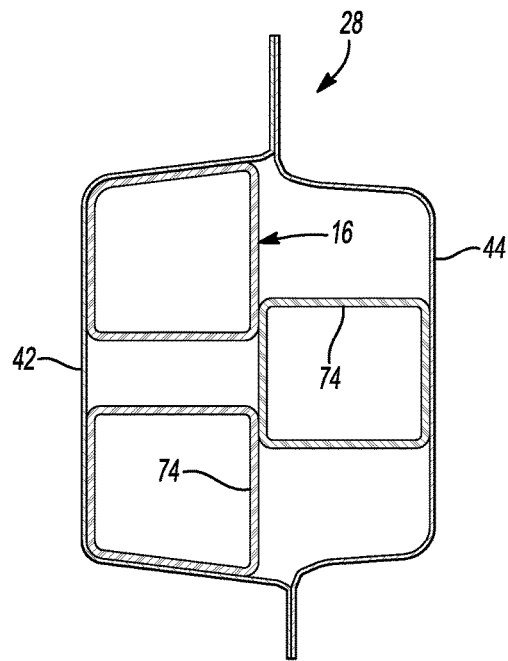
FIG. 9 is a cross-sectional view of an alternative embodiment of a rocker reinforcement formed longitudinally extending conjoined tubes inside a rocker panel and side sill.

Referring to FIG. 9, a longitudinal tube reinforcement 16 is shown disposed within a rocker assembly 28 that includes the rocker panel 42 and side sill panel 44. The longitudinal tube reinforcement 16 is made up of three tubes 74, preferably formed in a plastic extrusion process, that are secured together with an adhesive, thermal or solvent welding process. Alternatively, several tubes 74 could be extruded together to eliminate the need to assemble tubes 74 that are individually extruded.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rocker assembly for a vehicle comprising:
    a rocker;
    a side sill attached to the rocker; and
    a reinforcement including plural first fins disposed in a longitudinal and transverse plane, and plural second fins disposed in the transverse plane and a vertical plane that intersect with the first fins, and a wall disposed in the longitudinal plane and the vertical plane at an intermediate location on the first fins.

2. The rocker assembly of claim 1 wherein the wall includes plural frames that define a window, wherein the frames extend between the window and the first and second fins.

3. The rocker assembly of claim 2 wherein a size of the windows defined by the frames is changed to adjust the stability of the wall.

4. The rocker assembly of claim 1 wherein the first and second fins have first and second outer edges that conform to an inner surface of the rocker and an inner surface of the side sill and are secured with an adhesive to the rocker and the side sill.

5. The rocker assembly of claim 1 wherein the first and second fins have a front column and a rear column of cells that are open to the rocker and side sill, and wherein the first fins have an upper row and lower row of cells that are open to the rocker and side sill.

6. The rocker assembly of claim 5 wherein the first and second fins are arranged to form plural four sided cells inside the front column and the rear column of cells and the upper row and the lower row of cells.

7. The rocker assembly of claim 6 wherein plural frames that define a window are only provided on the rows of cells between the upper and lower rows of cells.

8. The rocker assembly of claim 1 wherein the second fins have an outer edge that conforms to an inner surface of the rocker and an inner surface of the side sill.

9. The rocker assembly of claim 1 wherein the first fins are spaced apart to a lesser extent to increase rigidity of the reinforcement.

10. The rocker assembly of claim 1 wherein the second fins are spaced apart to a lesser extent to increase rigidity of the reinforcement.

11. The rocker assembly of claim 1 wherein thickness of the first fins is increased to increase rigidity of the reinforcement.

12. The rocker assembly of claim 1 wherein thickness of the second fins is increased to increase rigidity of the reinforcement.

* * * * *